United States Patent [19]
Barrett et al.

[11] Patent Number: 5,917,835
[45] Date of Patent: Jun. 29, 1999

[54] ERROR MITIGATION AND CORRECTION IN THE DELIVERY OF ON DEMAND AUDIO

[75] Inventors: Phil Barrett, Redmond; Dennis Clawson, Seattle; Christopher Carden, Seattle; Stephanie Leif, Seattle; Thomas Boutell, Seattle; Richard Wesley, Seattle, all of Wash.

[73] Assignee: Progressive Networks, Inc., Seattle, Wash.

[21] Appl. No.: 08/631,846

[22] Filed: Apr. 12, 1996

[51] Int. Cl.[6] .................................................. H03M 13/00
[52] U.S. Cl. ........................... 371/37.4; 369/48; 369/93; 348/410; 348/390; 348/399
[58] Field of Search ................................ 371/37.4; 348/6, 348/410, 399, 390; 369/48, 93; 380/19; 711/157

[56] References Cited

U.S. PATENT DOCUMENTS

| | | | |
|---|---|---|---|
| 3,423,729 | 1/1969 | Heller | 340/146.1 |
| 3,544,963 | 12/1970 | Tong | 340/146.1 |
| 4,539,684 | 9/1985 | Kloker | 371/46 |
| 4,901,319 | 2/1990 | Ross | 371/45 |
| 4,907,233 | 3/1990 | Deutsch et al. | 371/37.4 |
| 4,964,128 | 10/1990 | Sako et al. | 371/39.1 |
| 5,022,029 | 6/1991 | Guichon | 371/38.1 |
| 5,091,936 | 2/1992 | Katznelson et al. | 380/19 |
| 5,121,395 | 6/1992 | Millar | 371/39.1 |
| 5,159,452 | 10/1992 | Kinoshita et al. | 358/141 |
| 5,243,428 | 9/1993 | Challapali et al. | 358/167 |
| 5,257,271 | 10/1993 | Lagadec et al. | 371/37.4 |
| 5,487,067 | 1/1996 | Matsushige | 370/85.7 |
| 5,594,490 | 1/1997 | Dawson et al. | 348/6 |

OTHER PUBLICATIONS

Rault et al., "The Coded Orthogonal Frequency Division Multiplexing (COFDM) Technique, And Its Application To Digital Radio Broadcasting Towards Mobile Receivers", IEEE, pp. 12.3.1.–12.3.5, 1989.

Weck, "digital Audion Broadcasting: Optimizing Of A Combined of a combined Concept Of Source And Channel Coding With Respect Of Subjective Criteria", IEEE, pp. 360–363, 1988.

*Primary Examiner*—William Grant
*Assistant Examiner*—McDieunel Marc
*Attorney, Agent, or Firm*—Ronald M. Anderson

[57] ABSTRACT

A method and system for mitigating and compensating for loss of digital audio data transmitted as a stream of packets to a client (30). A server (10) compresses digital audio data corresponding to a digitized analog audio signal. The compressed data are divided into N frames of data per packet. The server interleaves the frames, producing interleave packets of up to order N. The interleave operation minimizes the effect of any lost packet when the interleave packets are received, deinterleaved, and converted to an analog signal that is played on a speaker at the client. Lost frames are replaced using the data from frames that are received. As a further aspect, the frames can be scrambled at the server by applying a permutation function F that depends upon the packet number (PN) and a Key value. At the client, an inverse permutation function $F^{-1}$ is applied to unscramble the frames.

27 Claims, 9 Drawing Sheets

ERROR MITIGATION AND CORRECTION IN THE DELIVERY OF ON DEMAND AUDIO

FIELD OF THE INVENTION

This invention generally relates to the transfer of digital audio data between a transmitting station and a receiving station, and more specifically, to the transfer of packets of audio data between a server and a client on a network, each packet including one or more frames of digital audio data.

BACKGROUND OF THE INVENTION

Improved ease of access to the Internet has greatly increased its popularity and led to the development of new forms of communication over the net. One new development enables audio data to be transferred in real time, on demand. The waveforms comprising the audio data are digitized, and the resulting digital audio data are transferred over the Internet from a source to a connected personal computer as a continuous stream of packets. Each packet includes a predefined number of frames arranged in a temporally contiguous sequence; and each frame includes a different portion of the digital audio data. When the streams of packets are received by the client, the digital audio data are extracted and passed to an appropriate audio output device, such as a sound card, for play. Before output occurs, the digital audio data are converted to a suitable audio waveform file format, depending upon the type of platform of the client computer and the audio output hardware employed.

A problem with delivering real time audio from a server over the channel of a network arises if noise or some other data transmission fault occurs, causing a loss of one or more packets conveying the frames of digitized audio data. Loss of a packet containing N frames of temporally sequential audio data can have a significant impact on the intelligence communicated by the audio data. For example, if the lost packet includes digitized audio data communicating the word "not," a statement that originally communicated the idea "I am not a crook" would be heard by the recipient as "I am__a crook." Clearly, it would be preferable to minimize any audible effect of a data loss or dropout to avoid this kind of problem.

Ideally, in addition to minimizing the effect of a data loss or dropout during transmission of the data to a recipient, if possible, a technique for conveying audio and other data should replace frames of the data that are not received due to dropout or other types of signal corruption and loss. Conventional schemes for transferring data can use cyclic redundancy or other error detection algorithms to detect that a loss has occurred, but generally are not able to fill in the data frames in a lost packet. Schemes that can correct a partial loss of the data are generally too processor intensive to operate in a real time system for playing the audio data that has been received.

Another desirable feature in a reliable method for transferring audio data would be the ability to prevent third parties from readily using the data. Although complicated encryption techniques might be employed for this purpose, it would be better to apply a relatively simple method for encrypting the data that does not add much processing overhead at either the server or the client end of the communication link.

Any method used to minimize the impact of packet loss must be very efficient. For handling real time audio data transmission over conventional telephone line modems, the packets must be processed quickly to avoid losing frames of data or causing the client to fall behind in processing the data transferred from the server. Any significant delay in processing the data that are received will be evident as an audible pause in the audible signal as the data are played by the client.

It will be apparent that a method for transferring data so as to minimize the effect of data loss can also be applied to other types of data besides audio data and used on other networks besides the Internet. In fact, almost any type of streaming data could be transferred using such a technique. For example, video data might be transferred bidirectionally between desktop video phones. The technique could also be applied to voice mail systems or to any system in which data tolerant of a limited number of errors must be conveyed between two computers.

SUMMARY OF THE INVENTION

In accordance with the present invention, a method is defined for conveying digital audio data from a server to a client, so as to minimize errors. The method includes the steps of dividing the digital audio data among a plurality of temporally contiguous frames; each frame includes a successive portion of the digital audio data. A plurality of packets is used for conveying the digital audio data from the server to the client. Each packet includes a plurality of the frames interleaved in a predefined manner so that adjacent frames in each packet do not contain temporally contiguous portions of the digital audio data. The packets are transmitted from the server to the client. At the client, the frames included in the packets are deinterleaved, so that the portions of the digital audio data included in the frames are sequentially and temporally arranged in order.

If a packet is corrupted or otherwise lost during transmission of the packets from the server to the client, the frames included in the packet that was lost are replaced using the portions of the digital audio data included in sequentially and temporally adjacent frames that were conveyed in other packets received by the client. For example, a lost frame included in the packet that was lost is replaced at the client using either the previous or the next frame in the original temporal sequence. The temporally previous frame includes a portion of the digital audio data that immediately precedes the portion of the digital audio data included in the lost frame. Similarly, the temporally next frame includes a portion of the digital audio data that immediately follows the portion of the digital audio data included in the lost frame. The frame that is used to replace a lost frame may depend upon a function that determines a preferred replacement frame, by choosing the frame that includes a portion of the audio data, which more closely matches the portion of the audio data included within the lost frame. Alternatively, the lost frame may be replaced at the client with a frame that includes an approximate replacement for the portion of the digital audio data included in the lost frame, based upon the portions of the digital audio data included in other frames that were received at the client.

Generally, up to N packets can be interleaved, where N is equal to the number of frames per packet. Preferably, the method further includes the step of compressing the digital audio data at the server; and the step of decompressing the digital audio data at the client.

Optionally, the method may include the steps of applying a permutation function to the frames in each packet at the server. The permutation function is used to reorder the frames in the packet from an original state. A corresponding inverse permutation function is applied to the frames in each packet received at the client to restore the original state of the frames. Both the permutation and inverse permutation functions are based upon a key that may be independently determined by both the client and the server.

A further aspect of the present invention is directed to an article of manufacture that is adapted to be used in connection with a computer. The article of manufacture includes a memory medium on which are stored machine instructions that implement a plurality of functions useful for conveying data to another location, when the machine instructions are executed by a computer. The functions include dividing data having a temporal sequence into a plurality of frames, each of which includes a portion of the data. Further, the functions include dispersing the plurality of frames in a data stream that is transmitted to a different location, so that frames including temporally sequential portions of the data are not adjacent to each other in the data stream. Other functions implemented by the machine instructions are generally consistent with the steps carried out at the server in the method discussed above.

Yet another aspect of the present invention is directed to an article of manufacture that comprises a memory medium on which are stored machine instructions. The machine instructions generally implement functions consistent with the steps carried out at the client in the above-described method, to process the frames dispersed in a data stream transmitted from the server.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

A preferred embodiment of the present invention has been developed for commercial application under the trademark REAL AUDIO™. Although the initial application of this invention will be for distribution of digital audio data over the Internet, it is also contemplated that the invention can be used for distributing digital audio data over other types of networks in which data may be lost during transmission that might adversely impact upon the intended meaning of the audio content. The digital audio data, which are in the form of packets, can be delivered over any kind of channel that provides for communication between two computers and therefore, this invention is not limited to a specific network such as the Internet. Furthermore, the present invention can be extended to other forms of compressed and digitized analog data, such as video data.

Figure 1:
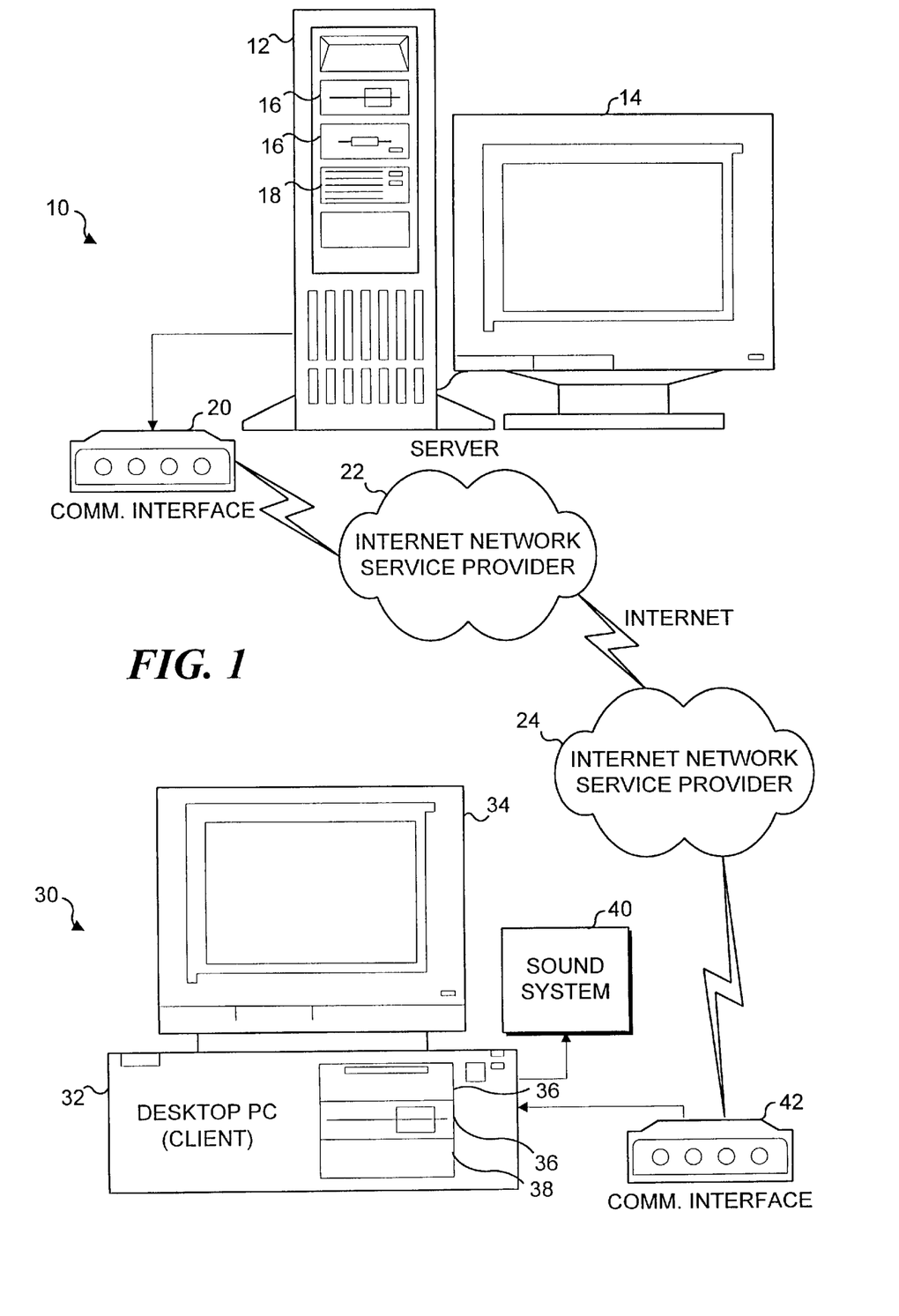
FIG. 1 is a schematic block diagram illustrating a server communicating audio data over the Internet to a client, in accordance with the present invention.

As shown in FIG. 1, the preferred embodiment of the invention is illustrated simplistically to represent a channel that interconnects a server 10 with a client 30 through an Internet network channel that couples two Network service provider 22 and 24. As those of ordinary skill in the art will understand, the Internet network channel may comprise any of a variety of different types of communication links for interconnecting client 30 with server 10. Perhaps the most typical Internet network channel is implemented through a service provider, such as the MICROSOFT NETWORK™ or MCI™. Although not specifically shown in FIG. 1, the service provider is typically connected to the Internet via a plurality of high speed data lines, and the client calls into this service provider over an analog telephone line or via an integrated services digital network (ISDN) line. Similarly, server 10 is typically coupled to an Internet service provider through an appropriate high speed data line, such as a T1 link. Typically, the server is connected to the Internet via a high speed permanent connection, so that multiple clients can be serviced and so that the server is always available. The client, on the other hand, may only connect periodically. Alternatively, server 10 and client 30 may be directly connected through a conventional telephone line, or for higher speed communication, through a T1 link or ISDN line.

Server 10 includes a processor chassis 12 in which are mounted one or more floppy drives 16 and one or more hard drives 18. Included within processor chassis 12 is a motherboard on which are mounted a central processing unit (CPU), random access memory (RAM), and read only memory (ROM)—none of which are separately shown. Furthermore, other components of a personal computer intended for use as a server are included within processor chassis 12, as are well known to those of ordinary skill in the art.

A monitor 14 is coupled to the motherboard within processor chassis 12, as is a communication interface 20. Communication interface 20 may comprise a simple analog modem, an ISDN digital modem (or terminal adapter) or other high speed communication interface for coupling server 10 to the channel through which data are communicated to client 30. Although FIG. 1 represents only a single channel coupling server 10 to client 30, it will be appreciated that in a typical commercial application of the present invention, server 10 will be simultaneously similarly coupled to a plurality of clients 30, each of which communicates with the server, making requests for delivery of digitized audio.

Client 30 also includes a processor chassis 32 in which are mounted floppy drives 36 and a hard drive 38. Processor chassis 32 includes a motherboard on which are mounted a CPU and other components typically comprising a personal computer—none of which are separately shown. A monitor 34 is coupled to the motherboard through a suitable display driver port. In order to reproduce the audio delivered from server 10, client 30 includes a sound system 40, typically comprising a sound card, coupled to drive, for example, external speakers that include an integrated pre-amplifier/amplifier. Sound system 40 is thus substantially identical to the sound system used on multimedia personal computers, as well known to those of ordinary skill. In addition, a communication interface 42 is coupled to a serial port or other suitable port on the motherboard of processor chassis 32 for bidirectionally communicating over the Internet network channel with server 10, via Internet service providers 22 and 24. Typically, communications interface 42 will comprise a high speed analog phone line modem capable of communicating at speeds of at least 14.4 Kbps. Alternatively, the communications interface may comprise an ISDN digital modem or other high speed data interface capable of data transfer speeds.

Figure 2:
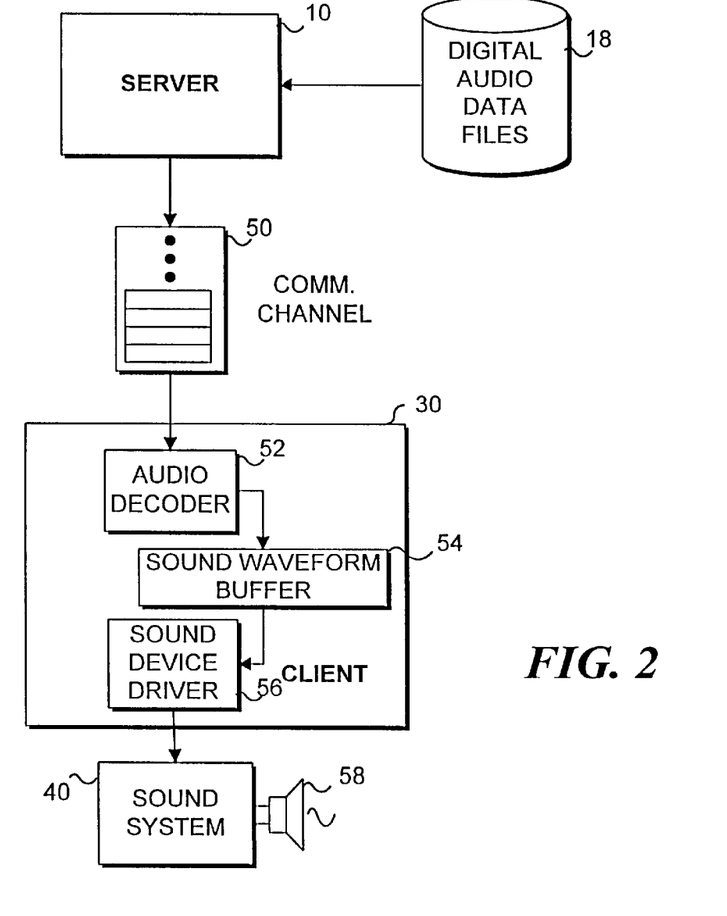
FIG. 2 is a functional block diagram that illustrates the communication of digital audio data from a server to a client.

Turning to FIG. 2, other details of server 10 and client 30 illustrate more clearly how digital audio data are provided on demand by the server to a client in accordance with the present invention. Stored on hard drive 18 of server 10 are digital audio data files, any of which may be requested by client 30 for transmission over the Internet or other channel. Although currently, the digital audio data files typically only include digitized speech, it is contemplated that in the future, music will be digitized and stored on hard drive 18 for transmission on demand to client 30. To produce the digital audio data files, analog sound recorded on a magnetic media is processed through an analog-to-digital converter, which digitizes the analog signal producing corresponding digital data.

A user at client 30 is typically presented with a graphic menu in which a plurality of hyper text or graphic objects are displayed, each corresponding to a different audio file that can be selectively transferred to the client to play in real time. Once a specific digital audio data file has been selected by the user, the file is loaded into server 10 and processed to produce a stream of packets 50 that are transmitted over the communication channel to client 30 in accord with the present invention. In this invention, each packet comprises a block of data containing one or more frames of digital audio data. A frame is the smallest unit of transmitted digital audio data conveyed between the server and client and corresponds to a continuous fragment of an audio waveform that was digitized to produce the file stored at the server. To produce the stream of packets that are transmitted from server 10 to client 30, software running on server 10 processes the digital audio data file selected for transmission. The processing carried out by the server is explained below.

The transmitted packets of data are received by client 30. At client 30, a software program executed by the CPU within the personal computer processes the stream of packets as described below to recover the digital audio data included in the file that was originally input to server 10 from hard drive 18. An audio decoder 52 carries out this process, producing digital data that are input to a sound waveform buffer 54 in the client. The sound waveform buffer contents are read by a sound device driver 56, producing an analog audio output signal that is input to sound system 40. Sound system 40 amplifies the analog audio output signal to produce a signal with sufficient power to drive a speaker 58. Speaker 58 produces audible sound corresponding to the sound that was originally recorded and digitized to produce the digital audio data contained in the files stored on hard drive 18 that were selected by the user at client 30.

Figure 3:
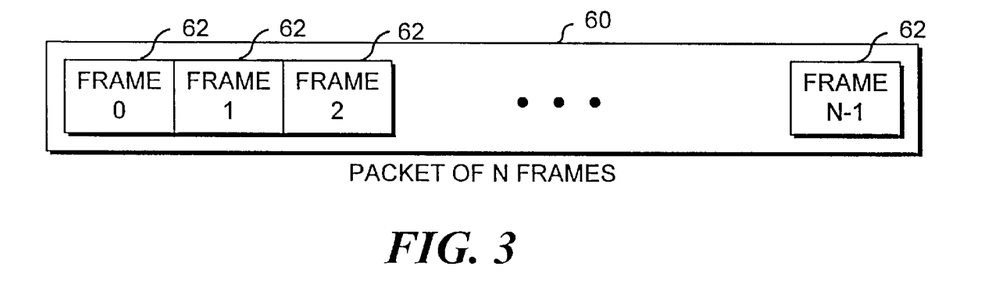
FIG. 3 is a block diagram of a packet that includes frames of data in an original temporal sequence.

FIG. 3 illustrates a packet 60 that includes N frames 62. In this illustration, frames 62 within packet 60 are sequentially ordered and identified as frames 0 through N-1. To improve the performance of the system in transferring real time audio, and to enable the transfer to occur using modems that operate at 14.4 Kbps, the audio within each frame is compressed, using a lossie (as compared to a lossless) compression scheme that yields a compression of 176/1. As a result, each frame includes approximately 50 milliseconds of compressed audio, corresponding to 20 bytes of digital data. In the preferred embodiment, there are twelve frames per packet, so that each packet includes approximately 0.25 seconds of compressed audio.

To enable music to be transmitted in real time in accord with the present invention, the client and server must be connected using modems or other communication interfaces operating at a data rate of at least 28.8 Kbps, and a lossie compression scheme producing a compression ratio of 88/1 will likely be employed. As a result, each frame of digitized music will include 40 bytes of data. In any case, the type of compression and compression scheme used in conveying digital audio data, and the number of frames per packet and amount of data per frame are not in any way limiting in regard to practicing the present invention, since they relate to details that are a matter of design and can be determined as appropriate by those of ordinary skill in the art for different applications of this invention.

As noted above in the Background of the Invention, loss of a packet of digital audio data that conveys N sequential frames can adversely impact the intelligence conveyed by the audio data. Loss of important words in the audio message, such as the negative words "no" or "not," can have a substantial impact on the meaning of the message conveyed. The loss of a packet in a data transmission over telephone lines and other noisy channels can occur with substantial frequency, e.g., more than ten percent of the packets transmitted can be lost during a given time frame. The present invention mitigates any impact on the intelligence conveyed by the data by compensating for the loss of packets that may occur from time to time.

Figure 4:
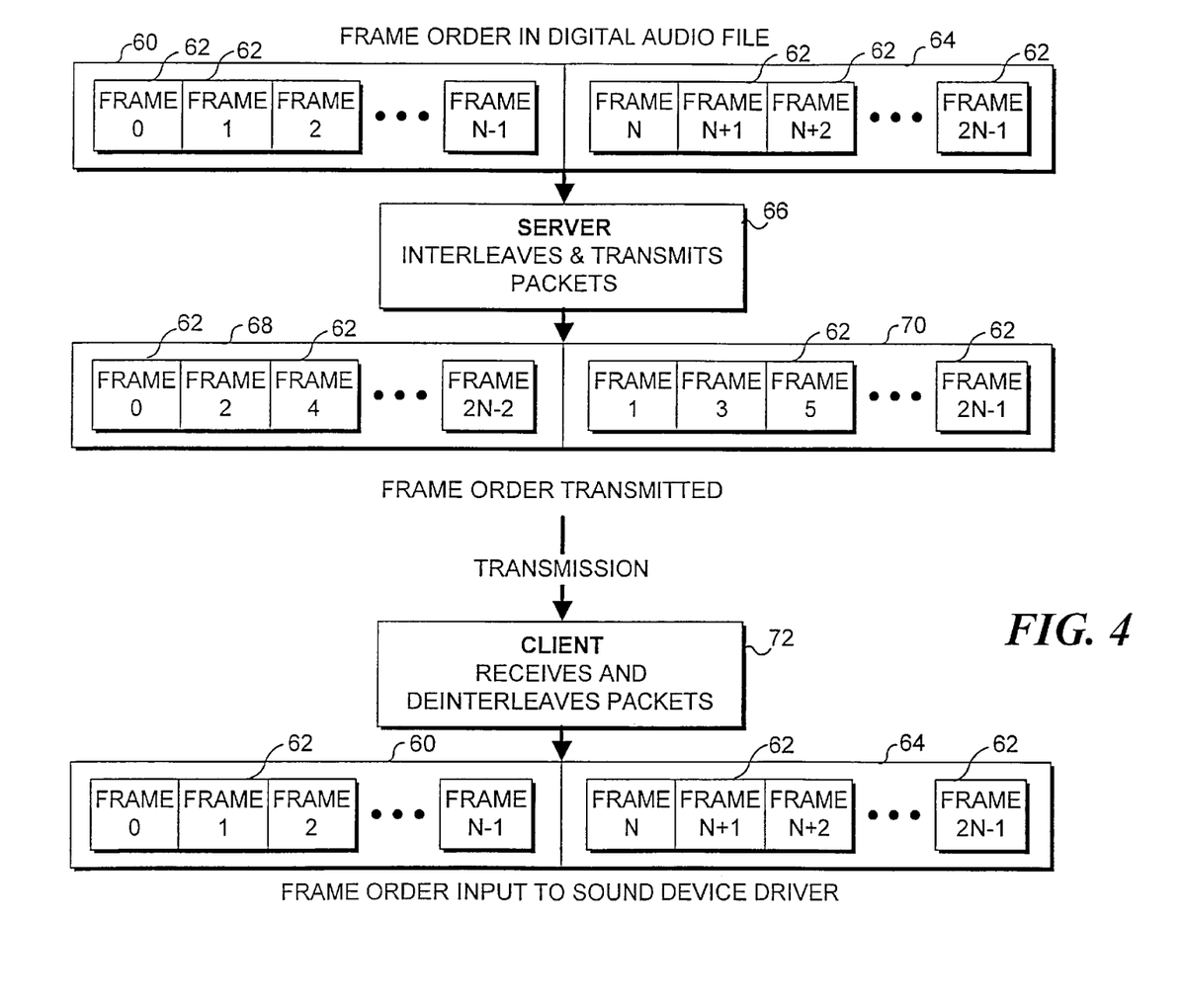
FIG. 4 is a functional block diagram that illustrates the steps of the method for handling frames of data interleaved within packets that are transmitted from a server to a client.

FIG. 4 illustrates the technique used for transmitting a stream of packets in accord with the first embodiment of the present invention. In this Example, only two packets 60 and 64 are illustrated, and it will be understood that many more packets are typically transmitted from the server to the client to convey a file in real time. Packet 60 includes frames 62 that are sequentially ordered between frame 0 and frame N-1, and packet 64 includes frames 62, sequentially ordered between frame N and frame 2N-1. The packets are processed by the server, as indicated in a block 66. The server interleaves the frames in packets 60 and 64, producing packets 68 and 70. In packet 68, frames 62 are ordered so that every other frame, i.e., all of the even frames between frame 0 and 2N-2 are included within packet 68, and all of the remaining frames are included within packet 70, i.e., all of the odd frames sequentially ordered from frame 1 through frame 2N-1. The packets containing the interleaved frames are received by the client, as noted in a block 72. The client deinterleaves the packets to restore the frames to their previous original sequence, thereby recovering packets 60 and 64. The frames in packets 60 and 64 can then be input to the sound device driver so that the audio signal can be heard by the user at the client location.

Figure 5:
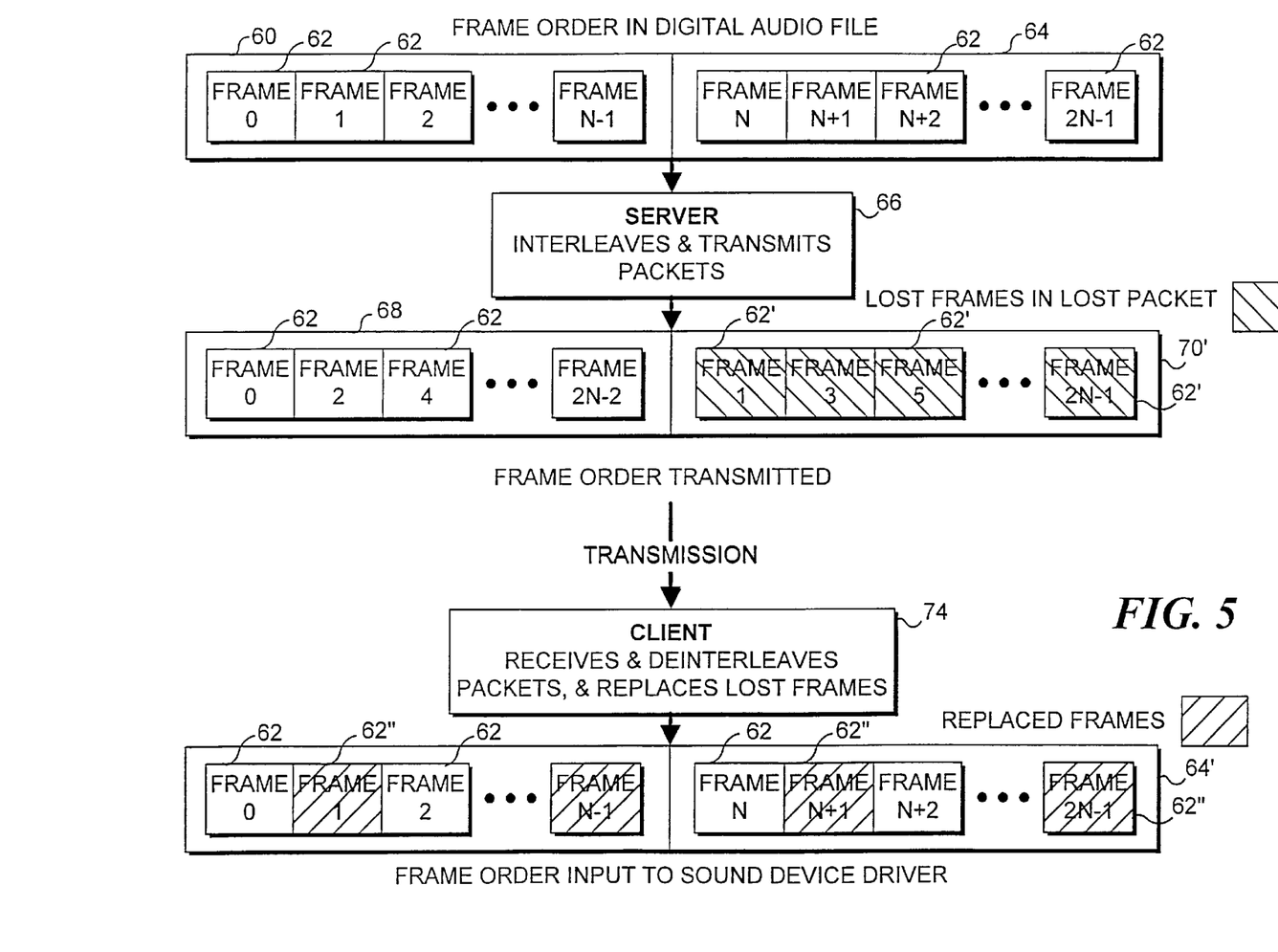
FIG. 5 shows how frames in a packet lost during transmission from the server are replaced at the client in accordance with the present invention.

FIG. 5 illustrates the advantage of the present invention in dealing with a situation in which a packet is lost during the transmission of the interleaved frames from the server to the client. As in the previous illustration shown in FIG. 4, packets 60 and 64 are interleaved by the server and transmitted over the communication channel to the client. However, packet 70 is lost or corrupted during transmission to the client, so that frames 62' in a lost packet 70' fail to reach the client. As indicated in a block 74, the client is able to receive and deinterleave the frames in packets that are not corrupted, and using the information conveyed in the frames of the packets that are received properly, the client is able to replace the frames conveyed by the lost packet, producing frames 62" that approximate the audio data contained in lost frame 62'. The techniques used for producing frame 62" are described below.

Although this simple Example only illustrates two adjacent frames of the many that would be transmitted, it should be understood that each successive pair of adjacent frames are interleaved at the server, and then deinterleaved at the client. More importantly, the interleaving process can be generalized to provide packets that are interleaved to contain frames from up to N different original packets, where N is the number of frames per packet. Thus, since the preferred embodiment uses packets that include N=12 frames, after the interleaving process, each packet would contain frames interleaved from up to twelve of the original packets. Alternatively, a different order of interleave may be used. For example, if a 4-way interleave is employed, a first interleave packet would contain frames 0, 4, 8, 12, etc. and a second interleave packet would contain frames 1, 5, 9, 13, etc. The third interleave packet would contain frames 2, 6, 10, 14, etc., and the fourth interleave packet would contain frames 3, 7, 11, 15, etc.

The greater the order of interleave, the less effect that loss of a single packet will have on the intelligence of the data that are received, since fewer frames in a packet that is restored by deinterleaving must be replaced by an approximated frame that was in a packet lost in transmission. If there are twelve frames per packet and each interleave packet includes only one frame from each of twelve different packets, loss of the complete data or intelligence in one of the original packets is minimized, and the effect of losing one of the interleave packets is spread over twelve of the original packets.

Figure 6:
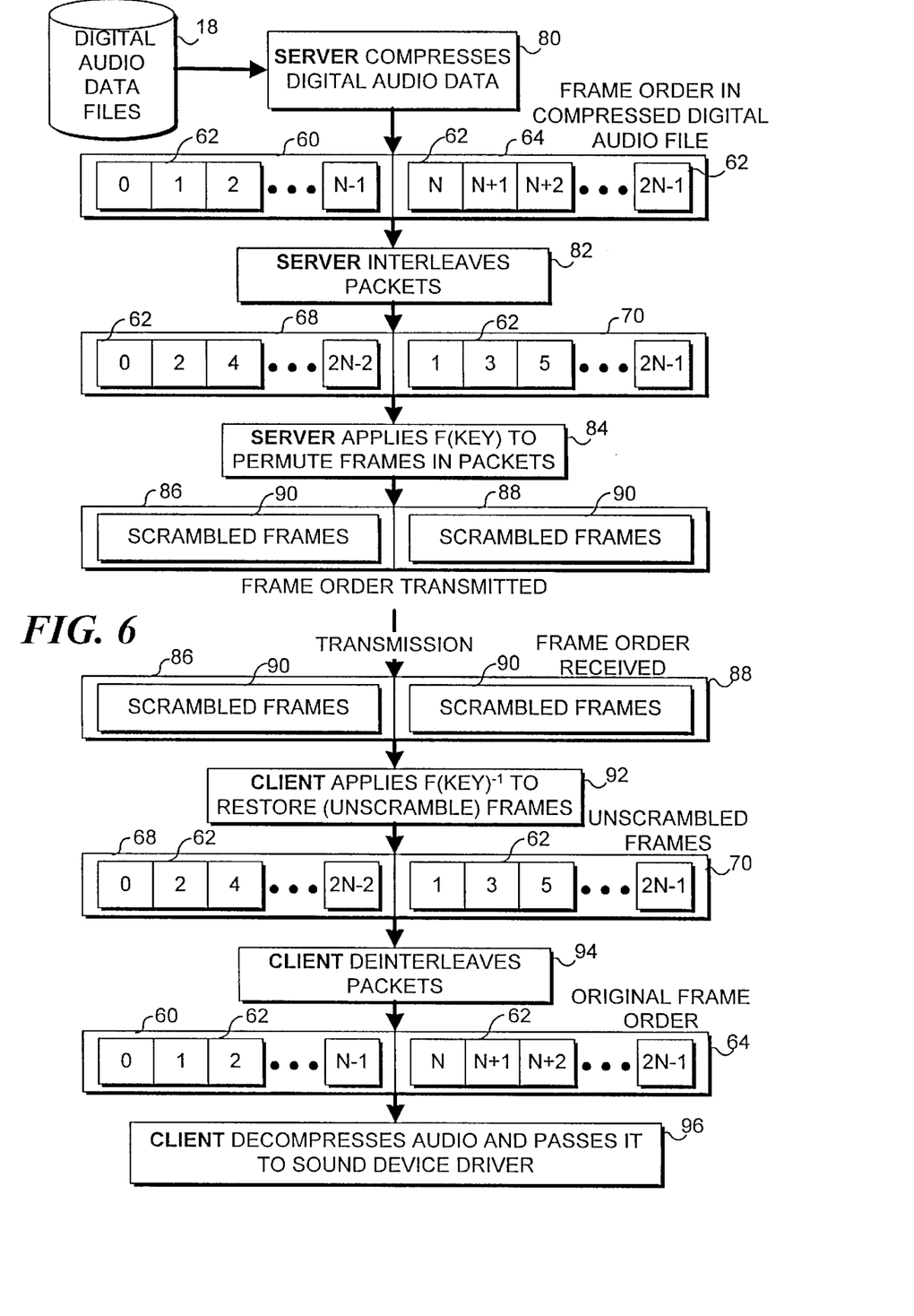
FIG. 6 is a functional block diagram illustrating a further embodiment of the present invention that applies a permutation to the frames in each packet before transmission to the client.

FIG. 6 shows details of a further aspect of the present invention wherein a nonlinear interleave process is used so that the interleaved frames within a packet that is transmitted are not sequentially ordered as described above. In addition to interleaving the frames within each packet, a permutation function F is applied to the packets before they are transmitted. This permutation function takes as its arguments a packet number (PN), a client specific number (Key), and a vector V of N unique integers in the range 0 to N-1. The function F produces a permutation on V based upon the Key. Furthermore, there is a function $F^{-1}$ having the property that when provided with the same PN and Key value, returns the vector V to its original order. The vector V contains the components $V_i$ for i=0 to N-1, wherein $V_i$=i. The function F(PN, Key, V) is applied at the server to permute the frames within a given interleave packet prior to its transmission to the client. Similarly, the client applies the inverse function $F^{-1}$(PN, Key, V) to permute the frames within the received packet back to the pre-permutation order so that they can be deinterleaved as described above. The value of Key is computed by the client and server independently, and thus need not be transmitted.

An embodiment that uses a permutation function is illustrated in FIG. 6. A digital audio data file stored on hard drive 18 is loaded by the server and compressed as indicated in a block 80. As before, only two packets 60 and 64 are illustrated, containing sequentially ordered frames 62 that range between frame 0 and frame N-1 in packet 60 and frame N through 2N-1 in packet 64. In a block 82, the server interleaves the frames within these packets, producing interleave packets 68 and 70, as discussed above. Next, in a block 84, the server applies the permutation function F to permute the frames within these packets, producing packets 86 and 88, each of which includes frames 90 in a scrambled order. Packets 86 and 88 are then transmitted by the server over the communication channel to the client.

As noted in a block 92, the client applies the inverse function $F^{-1}$ to packets 86 and 88, to restore or unscramble the frames. Interleave packets 68 and 70 are thus produced by this operation. Next, as indicated in a block 94, the client deinterleaves these packets, recovering packets 60 and 64, in which the frames are in their original non-interleaved order. Finally, in a block 96, the client decompresses the audio data comprising the sequentially ordered frames and passes the digital audio data to the sound device driver, enabling the user to hear the audio in real time.

Figure 7:
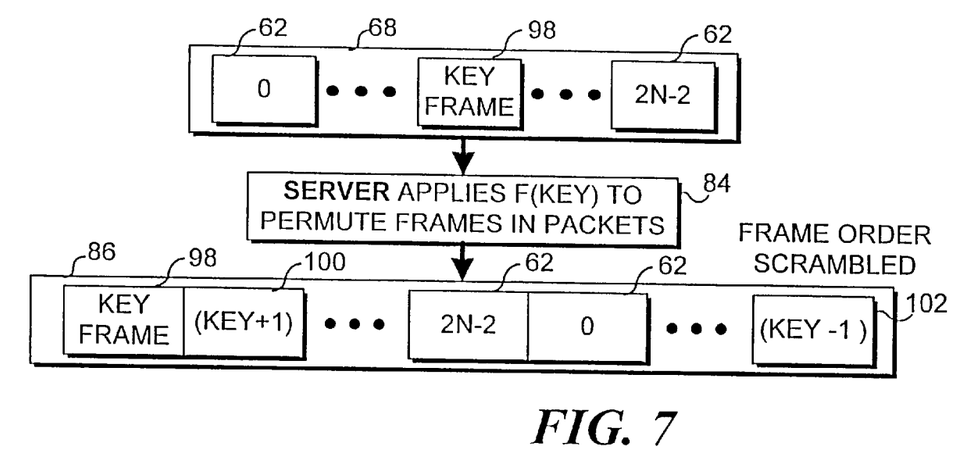
FIG. 7 is a block diagram that shows how the permutation is applied generally.

FIG. 7 illustrates the effect of permuting the frames within interleave packet 68. In packet 68, the Key frame is identified by reference numeral 98. When the server applies the permutation function F to permute the frames within packet 68, as indicated in a block 84, packet 86 results, in which the first frame in the packet is Key frame 98. A frame 100 is the second successive frame in packet 86 and is the frame that immediately followed the Key frame (Key+1). Similarly, successive frames after frame 100 are in order through frame 2N-2. The sequence then begins with frame 0, ending with a frame 102, which is the frame immediately preceding the Key frame (Key-1).

Figure 8:
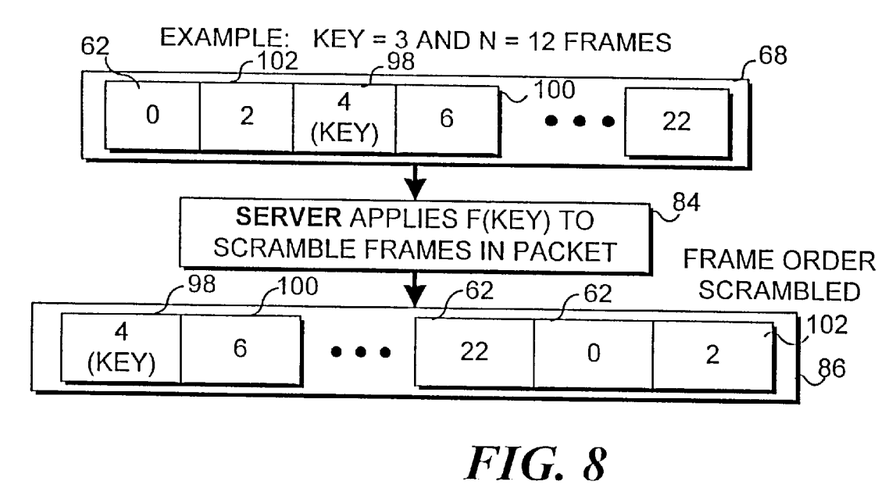
FIG. 8 is a block diagram illustrating a specific example of a permutation applied to the frames in a packet.

FIG. 8 presents a more concrete Example of the general case shown in FIG. 7. In this Example, the value Key is equal to 3, and the value of N=12 frames per packet. In the simple permutation of this Example, the frames within packet 68 are rotated left so that the Key frame becomes the first frame in packet 86. The frames originally disposed to the left of the Key frame are rotated to the far right end of the packet. Thus, frame 100, which was immediately to the left of the Key frame prior to the permutation operation, is thereafter disposed at the far end of packet 86. Frame 102, which followed the Key frame prior to the permutation operation, is thereafter the second frame in the packet of permuted frames.

Although the permutation function used in the Example discussed above is relatively straightforward, involving a simple rotation based on the value of Key, it will be appreciated that a more complex permutation can be applied to scramble the frames within a particular packet. Moreover, the Key applied to each packet in a transmission can differ, so that, for example, packet 88 is scrambled using an incremented Key value. The only requirement for the permutation of the frames within the packets transmitted is that the inverse permutation function be applicable by the client to unscramble the frames in successive packets that are received. Scrambling the frames within packets prior to their transmission has the effect of encrypting an audio message, since the frames within the packets that are obtained following processing by the client will not be properly sequenced unless the frames in the packets received are first unscrambled before being deinterleaved. The Key that is used for scrambling and unscrambling the packets can be determined by reference to a public Key, as is generally well known to those of ordinary skill in the art of encryption, so that the Key value need not be directly transmitted with the packets of audio data.

Figure 9:
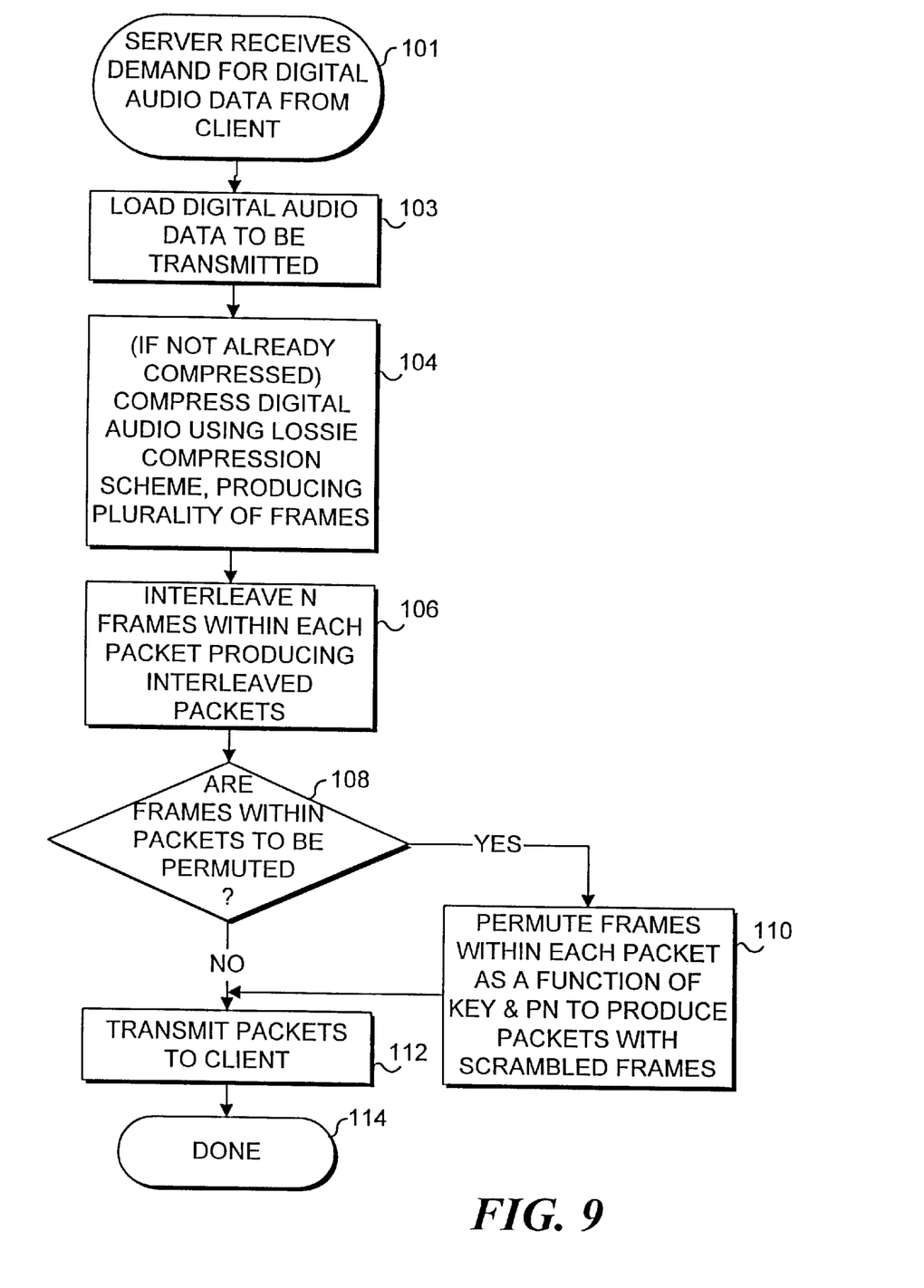
FIG. 9 is a flow chart illustrating the logical steps implemented by the server in producing a stream of packets that are transmitted to a client.

FIG. 9 is a flow chart that show the steps of the process implemented by server 10 in transmitting digital audio as a stream of packets to client 30 in accord with the present invention. In a block 101, the server receives a demand for digital audio data from the client. A block 103 provides for loading the digital audio data file that is to be transmitted from the hard drive at the server location so that the server can process the data contained therein. Next, in a block 104, the CPU in the server compresses the digital audio using a lossie compression scheme, producing a plurality of frames of data. Alternatively, in many applications for the present invention, the digital audio data will have previously been compressed before being stored on the hard drive. Within each packet, N frames are interleaved in a block 106, preferably using an N order interleave scheme.

A decision block 108 determines if a Key is to be applied to permute the frames within each packet. If so, in a block 110, the permutation function F is applied, causing a reordering of the frames within the packets as a function of the Key and PN, to produce packets with scrambled order frames. Alternatively, the logic proceeds to a block 112. From block 110, the logic also proceeds to block 112, which provides for transmission of the packets to the client. The process terminates in a block 114.

Figure 10:
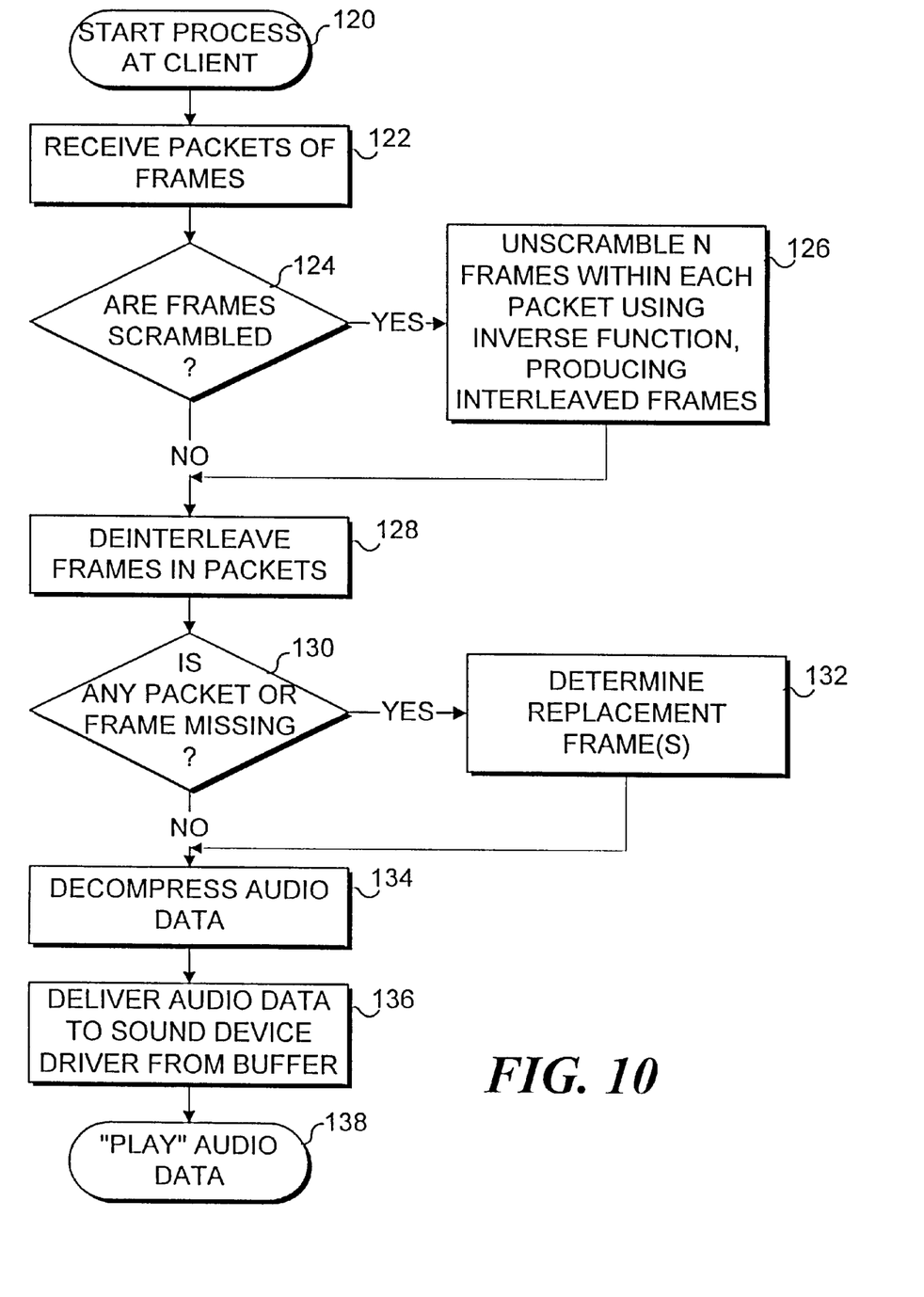
FIG. 10 is a flow chart illustrating the steps implemented by the client in processing the packets to recover the digital audio data for play.

As the client begins receiving the stream of packets from the server, a procedure for processing the packets begins at the client, as indicated in a block 120. The packets of frames are received over the communication channel, as indicated in a block 122. In a decision block 124, the CPU at the client determines if the frames in the packets are scrambled, based upon header information that precedes the first frame received. If so, as indicated in a block 126, the CPU uses the inverse function that was applied at the server to unscramble N frames within each packet, producing packets in which the frames are interleaved. Thereafter (or if the frames are not scrambled), a block 128 indicates that the client will deinterleave the frames in each packet.

In the event that a packet (or one or more frames within a packet) is missing, as determined in a decision block 130, the CPU produces or selects replacement frames, as indicated in a block 132. Details of this step are described below. Thereafter, a block 134 provides for decompressing the audio data conveyed by the deinterleaved frames, producing digital data that are loaded into an output buffer. The output buffer at least is partially filled before the data in the buffer are used, to ensure that small delays in the reception of the packet stream are not heard as the audio data are played by the client.

In a block 136, the audio data in the buffer are delivered to a sound device driver. Finally, in a block 138, the audio data are played, producing an audible signal that is output to speakers so that the user hears the audio signal. In order to accomplish this step, the sound device driver converts the digital data to an analog signal appropriate for driving a loudspeaker.

Figure 11A:
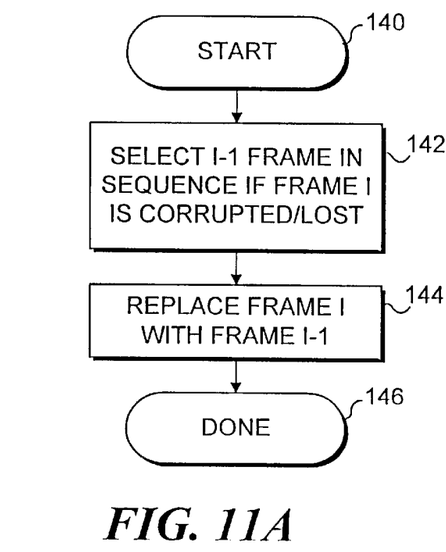
FIGS. 11A through 11D are flow charts showing different approaches used in replacing frames that are lost in transmission from the server to the client.

To determine a replacement frame for any frame that is missing in the packets of data that are received, several different approaches may be used, as shown in FIGS. 11A through 11D. In FIG. 11A, the process begins with a start block 140. In a block 142, the CPU selects the I+1 (preceding) frame in a sequence to replace a frame I that was corrupted or lost during transmission of the packets from the server to the client. In a block 144, frame I that is missing is replaced with the audio data included in frame I−1. In effect, this type of replacement simply repeats the audio data in a preceding frame. Since each frame of audio data is so short in duration, the error in the audio data that thus occurs is virtually inaudible.

Figure 11B:
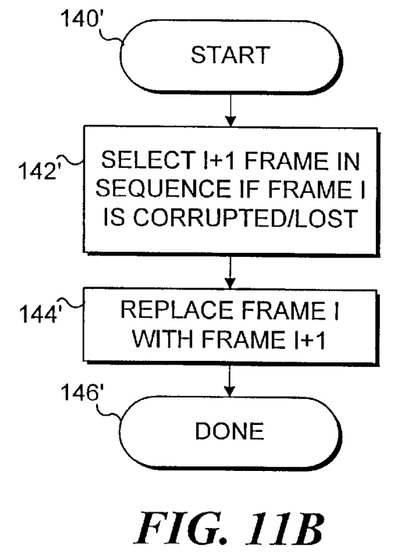

In FIG. 11B, an analogous approach for replacing a lost frame is illustrated, beginning at a start block 140'. In a block 142', frame I+1 (the next frame) is selected to replace frame I that was corrupted or lost in transmission. A block 144' provides for replacing lost frame I with the data in frame I+1. The process concludes with a block 146'.

Figure 11C:
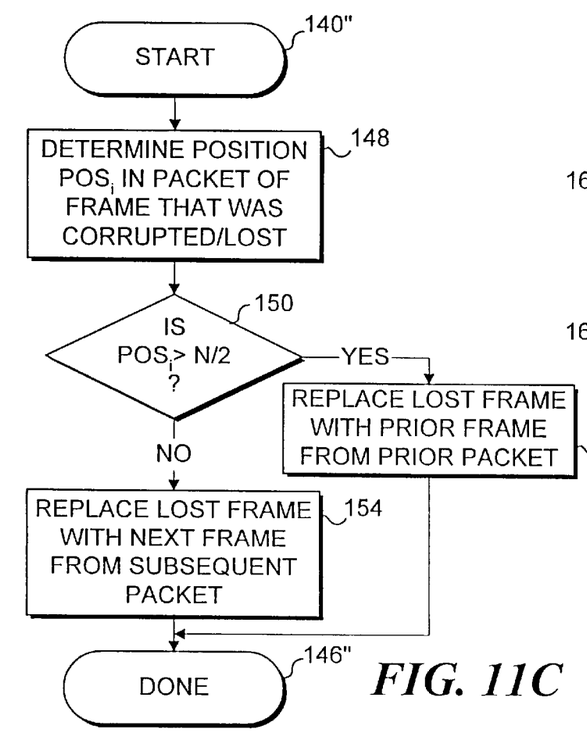

The technique used for replacing a lost frame shown in FIG. 11C can be generalized to that of selecting either the preceding or subsequent frame as a source of the replacement data, based on a function that selects whichever of these two frames is the better approximation of the lost frame. For the Example shown in FIG. 11C, the procedure begins with a start block 140". In a block 148, the relative position $POS_i$ of a lost frame in a packet that was lost is determined. The intent in this step is to determine whether the lost frame was in the first half of the packet or in the second half. This determination is made in a decision block 150, which determines if $POS_i$ is greater than N/2, where N is the total number of frames in the packet. If so, the lost frame was disposed in the last half of the packet. Accordingly, a block 152 provides for replacing the lost frame with the preceding frame. Conversely, if the lost frame was disposed in the first half of the packet, the lost frame is replaced with the next frame in the original order, since the following packet is not as likely to have been corrupted by noise or other problems causing the frame to be lost.

Figure 11D:
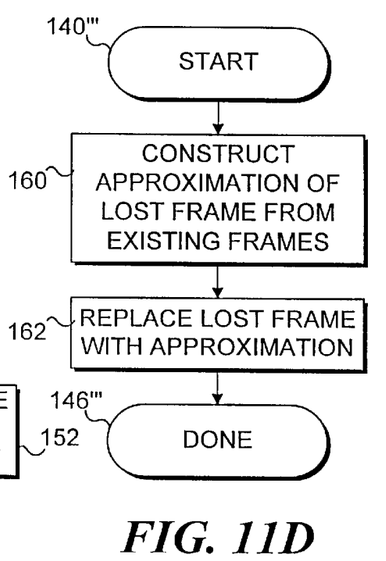

Finally, in FIGURE 11D, a fourth alternative is illustrated that begins at a start block 140''', proceeding to a block 160. In block 160, an approximation of the lost frame is constructed from the data included within existing frames that were received using a best fit technique. For example, a waveform comprising signals at different frequencies that are present in the previous and next packets (relative to the lost frame) could be used to approximate the waveform in the lost frame, i.e., the amplitude at each frequency would be linearly interpolated between the previous and the next frames to determine the waveform for the lost frame. In a block 162, the lost frame is replaced with the approximation data, concluding the process in a block 146'''.

Other techniques can also be used for determining the data that will be used for replacing frames that are lost or corrupted. Since each frame is of such short duration, a loss of accuracy that results from replacing a lost frame with data using any of the alternative techniques discussed above should have very little effect on the resultant audio message. This technique can thus readily compensate for the loss of individual frames or of an entire packet. However, if too many packets in succession are corrupted or lost, the loss of data will be audible in the sound signal that is produced at the client.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for conveying digital audio data from a server to a client, so as to minimize errors, comprising the steps of:
   (a) dividing the digital audio data between a temporally contiguous plurality of frames, each frame including a successive portion of the digital audio data;
   (b) forming a plurality of packets for use in conveying the digital audio data from the server to the client, each packet including a plurality of the frames interleaved in a predefined manner so that adjacent frames in each packet generally do not contain temporally contiguous portions of the digital audio data;
   (c) transmitting the packets from the server to the client; and
   (d) at the client, deinterleaving the frames included in the packets so that the portions of the digital audio data included in the frames are sequentially and temporally arranged in order.

2. The method of claim 1, wherein if a packet is corrupted or is otherwise lost during transmission of the packets from the server to the client, further comprising the step of replacing frames included in the packet that was lost using digital audio data included in sequential and temporally adjacent frames that are conveyed in other packets received by the client.

3. The method of claim 2, wherein a lost frame included in the packet that was lost is replaced at the client using one of a temporally previous and a temporally next frame, said temporally previous frame including a portion of the digital audio data that immediately precedes the portion of the digital audio data included in the lost frame, and said temporally next frame including a portion of the digital audio data that immediately follows the portion of the digital audio data included in the lost frame.

4. The method of claim 3, wherein said one of the temporally previous and temporally next frames is selected based upon a function that determines a preferred replacement frame, said preferred replacement frame being selected because it includes a portion of the audio data that more closely matches the portion of the audio data included in the lost frame.

5. The method of claim 3, wherein a frame included in the packet that was corrupted or otherwise lost is replaced at the client with a frame that includes an approximation of the portion of the digital audio data in the lost frame, based upon the portions of the digital audio data included in other frames that were received at the client.

6. The method of claim 1, wherein up to N packets are interleaved, where N is equal to the number of frames per packet.

7. The method of claim 1, further comprising the steps of compressing the digital audio data at the server and decompressing the digital audio data at the client.

8. The method of claim 1, further comprising the steps of applying a permutation function to the frames in each packet at the server, said permutation function being used to reorder the frames in the packet from an original state; and applying a corresponding inverse permutation function to the frames in each packet received at the client to restore the original state of the frames.

9. The method of claim 8, wherein both the permutation and inverse permutation functions are based upon a key that is independently determined by both the client and the server.

10. A method for conveying data between a first location and a second location, so as to minimize an impact of any data loss or dropout that may occur when conveying the data, comprising the steps of:
   (a) dividing the data, which are input in a temporal sequence, into a plurality of frames, each frame include a portion of the data;
   (b) dispersing the frames in a data stream that is transmitted from the first location to the second location, so that frames including temporally sequential portions of the data are not adjacent to each other in the data stream;
   (c) receiving the data stream at the second location;
   (d) at the second location, recovering the portions of the data from the frames in the data stream and restoring the portions of the data to the temporal sequence; and
   (e) replacing the portion of the data included in any frame that was not received at the second location, using portions of the data included in the frames that were received.

11. The method of claim 10, wherein the step of replacing the portion of the data in any frame not received comprises the step of using a temporally adjacent portion of the data included in one of the frames that were received.

12. The method of claim 11, wherein the step of replacing the portion of the data in any frame not received comprises the step of approximating said portion based upon the portion of the data in said one of the frames that were received.

13. The method of claim 11, further comprising the steps of applying a permutation to reorder the frames conveyed in each packet as a function of a permutation key; and applying an inverse permutation to restore the frames conveyed in each of the packets to an original order that the frames included in the packet had prior to applying the permutation, said inverse permutation also being a function of the permutation key.

14. The method of claim 13, wherein the permutation key is independently determined at each of the first and the second locations.

15. The method of claim 13, wherein the permutation key changes as a function of a packet number in the data stream.

16. The method of claim 10, further comprising the steps of compressing the data prior to conveying the frames between the first and the second locations; and decompressing the data after the frames are received at the second location.

17. The method of claim 10, further comprising the steps of conveying the frames of data that are dispersed in a plurality of packets.

18. An article of manufacture adapted to be used by a computer, comprising:
   a memory medium on which are stored machine instructions that implement a plurality of functions useful for conveying data to another location, when the machine instructions are executed by a computer, said functions including:
   (a) dividing data having a temporal sequence into a plurality of frames, each frame including a portion of the data; and
   (b) dispersing the frames in a data stream that is transmitted to a different location, so that frames including temporally sequential portions of the data are not adjacent to each other in the data stream.

19. The article of manufacture of claim 18, wherein the functions further include compressing the data prior to transmitting the frames to the other location.

20. The article of manufacture of claim 18, wherein the functions further include forming packets of the frames that are dispersed; and applying a permutation that reorders the frames included in each packet, from an original order to a scrambled order, said permutation being determined as a function of a permutation key that is supplied to the computer.

21. An article of manufacture adapted to be used by a computer, comprising:

a memory medium on which are stored machine instructions that implement a plurality of functions when the machine instructions are executed by a computer, said machine instructions being useful in enabling the computer to receive data transmitted from another location and to minimize an effect of any data loss or dropout, wherein portions of the data having an original temporal sequence are included in a plurality of frames that are dispersed in a data stream transmitted from the other location so that frames including temporally sequential portions of the data are not adjacent to each other in the data stream, said functions including:

(a) receiving the data stream;

(b) recovering the portions of the data from the frames in the data stream and restoring the portions of the data to the temporal sequence; and (c) replacing the portion of the data included in any frame that was not received at the second location, using portions of the data included in the frames that were received.

22. The article of manufacture of claim 21, wherein the data are compressed prior to being transmitted from the other location, said functions further including decompressing the data.

23. The article of manufacture of claim 21, wherein the portion of the data included in any frame that was lost is replaced using a temporally adjacent portion of the data included in a frame that was received.

24. The article of manufacture of claim 23, wherein the portion of the data in the frame that was lost is approximated based on the temporally adjacent portion of the data included in the frame that was received.

25. The article of manufacture of claim 21, wherein the frames that are dispersed are used to form packets that are transmitted from the other location, a permutation being applied to the frames in each packet as a function of a permutation key to change an order of the frames from an original order to a permuted order, and wherein the functions include applying an inverse permutation to the frames in each packet that is received to restore the original order of the frames in each packet, as a function of the permutation key.

26. A method for conveying digital audio data from a server to a client, so as to minimize errors, comprising the steps of:

(a) dividing the digital audio data between a temporally contiguous plurality of frames, each frame including a successive portion of the digital audio data;

(b) forming a plurality of packets for use in conveying the digital audio data from the server to the client, each packet including a plurality of the frames interleaved in a predefined manner so that adjacent frames in each packet generally do not contain temporally contiguous portions of the digit audio data;

(c) compressing the digital audio data prior to conveying the packets from the server to the client;

(d) transmitting the packets from the server to the client;

(e) at the client, deinterleaving the frames included in the packets so that the portions of the digital audio data included in the frames are sequentially and temporally arranged in order; and (f) decompressing the digital audio data after the packets are received at the client.

27. A method for conveying data between a first location and a second location, so as to minimize an impact of any data loss or dropout that may occur when conveying the data, comprising the steps of:

(a) dividing the data, which are input in a temporal sequence, into a plurality of frames, each frame include a portion of the data;

(b) dispersing the frames in a data stream that is transmitted from the first location to the second location, so that frames including temporally sequential portions of the data are not adjacent to each other in the data stream;

(c) compressing the data prior to conveying the frames between the first and the second locations;

(d) receiving the data stream at the second location;

(e) at the second location, recovering the portions of the data from the frames in the data stream and restoring the portions of the data to the temporal sequence;

(f) decompressing the data after the frames are received at the second location; and (g) replacing the portion of the data included in any frame that was not received at the second location, using portions of the data included in the frames that were received.

* * * * *